(12) United States Patent
Beziot et al.

(10) Patent No.: US 7,912,472 B2
(45) Date of Patent: Mar. 22, 2011

(54) PREEMPTION METHOD FOR MANAGEMENT OF RADIO RESOURCES IN A MOBILE COMMUNICATION NETWORK

(75) Inventors: Nathalie Beziot, Le Plessis Robinson (FR); Borja Jimenez Aldama, Paris (FR); Lionel Ammi, Chateauvillain (FR)

(73) Assignee: France Telecom, Paris (FR)

( * ) Notice: Subject to any disclaimer, the term of this patent is extended or adjusted under 35 U.S.C. 154(b) by 812 days.

(21) Appl. No.: 11/575,842

(22) PCT Filed: Sep. 12, 2005

(86) PCT No.: PCT/FR2005/002257
§ 371 (c)(1),
(2), (4) Date: Oct. 30, 2007

(87) PCT Pub. No.: WO2006/032749
PCT Pub. Date: Mar. 30, 2006

(65) Prior Publication Data
US 2008/0214220 A1    Sep. 4, 2008

(30) Foreign Application Priority Data

Sep. 22, 2004  (FR) ..................................... 04 10030

(51) Int. Cl.
*H04W 72/00* (2009.01)
(52) U.S. Cl. ....................... 455/450; 455/452.2; 455/453
(58) Field of Classification Search ............... 455/422.1, 455/450–453, 456.2, 464, 509, 510; 370/395.41, 370/332; 375/E7.141
See application file for complete search history.

(56) References Cited

U.S. PATENT DOCUMENTS

| | | | |
|---|---|---|---|
| 6,049,549 A * | 4/2000 | Ganz et al. ................... 370/449 |
| 6,094,431 A * | 7/2000 | Yamato et al. ........... 370/395.21 |
| 6,097,699 A * | 8/2000 | Chen et al. .................... 370/231 |
| 6,141,322 A * | 10/2000 | Poretsky ........................ 370/231 |
| 6,314,464 B1 * | 11/2001 | Murata et al. ................. 709/226 |
| 6,353,618 B1 * | 3/2002 | Hung et al. .................... 370/459 |
| 6,374,112 B1 * | 4/2002 | Widegren et al. .......... 455/452.2 |
| 6,522,629 B1 * | 2/2003 | Anderson, Sr. ............... 370/236 |
| 6,738,819 B1 * | 5/2004 | Li et al. .......................... 709/229 |
| 7,177,271 B2 * | 2/2007 | Shao et al. ..................... 370/229 |
| 7,797,439 B2 * | 9/2010 | Cherkasova et al. .......... 709/231 |
| 2004/0106405 A1* | 6/2004 | Gabriel et al. ............. 455/435.1 |

* cited by examiner

*Primary Examiner* — Dominic E Rego
(74) *Attorney, Agent, or Firm* — Cohen Pontani Lieberman & Pavane LLP

(57) ABSTRACT

The invention relates to management of radio resources allocated to communication channels each associated with requested QoS parameters in a mobile communication network, consisting of the following if there is a lack of resources when accepting a new channel request:
a—identify (30, 35) channels that might be preempted and among them, select (40) the lowest priority channel using an associated priority level;
b—evaluate (50, 55) the gain in resources obtained by at least partially reconfiguring it, said channel and said gain being memorized;
c—check (70) if the gain achieved by memorized channels is sufficient to support said new request, d—repeat steps a to c:
until the gain obtained is sufficient, in which case memorized channels are reconfigured and the new request is accepted (80), or
until all channels that could be preempted have been evaluated without obtaining sufficient gain, in which case the new request is refused (90).

20 Claims, 3 Drawing Sheets

PREEMPTION METHOD FOR MANAGEMENT OF RADIO RESOURCES IN A MOBILE COMMUNICATION NETWORK

CROSS-REFERENCE TO RELATED APPLICATION

This application is a National Stage application under 35 U.S.C. §371 and claims the benefit under 35 U.S.C. §119 (a) of International Application No. PCT/FR2005/002257 having an International Filing Date of Sep. 12, 2005, which claims the benefit of priority of France Application Serial Number 0410030 having a filing date of Sep. 22, 2004, both of which are incorporated herein in their entirety.

The invention relates to the telecommunications domain in general and is more particularly applicable to a method for managing radio resources at the access network in a mobile communication network in packet mode.

The method according to the invention is designed to be applied to mobile networks using the GPRS or UMTS technology conforming with the 3GPP standard. In order to avoid overcomplicating the description, a glossary is provided at the end of the description containing a definition of all acronyms used, and the reader can usefully refer to this glossary.

The UMTS standard specifies a new data transmission bearer service in packet mode and can provide subscribers to a mobile operator with various features including access to services based on IP (electronic messaging, downloading files, viewing Web or WAP sites). Therefore data (transmitted in IP package) can be exchanged between servers belonging to a network external to the UMTS network, typically the Internet network, and the mobile telephone. At the present time, the UMTS is phased in different versions, also called releases, and particularly Release 99, to which the following description is specifically applicable.

Figure 1:
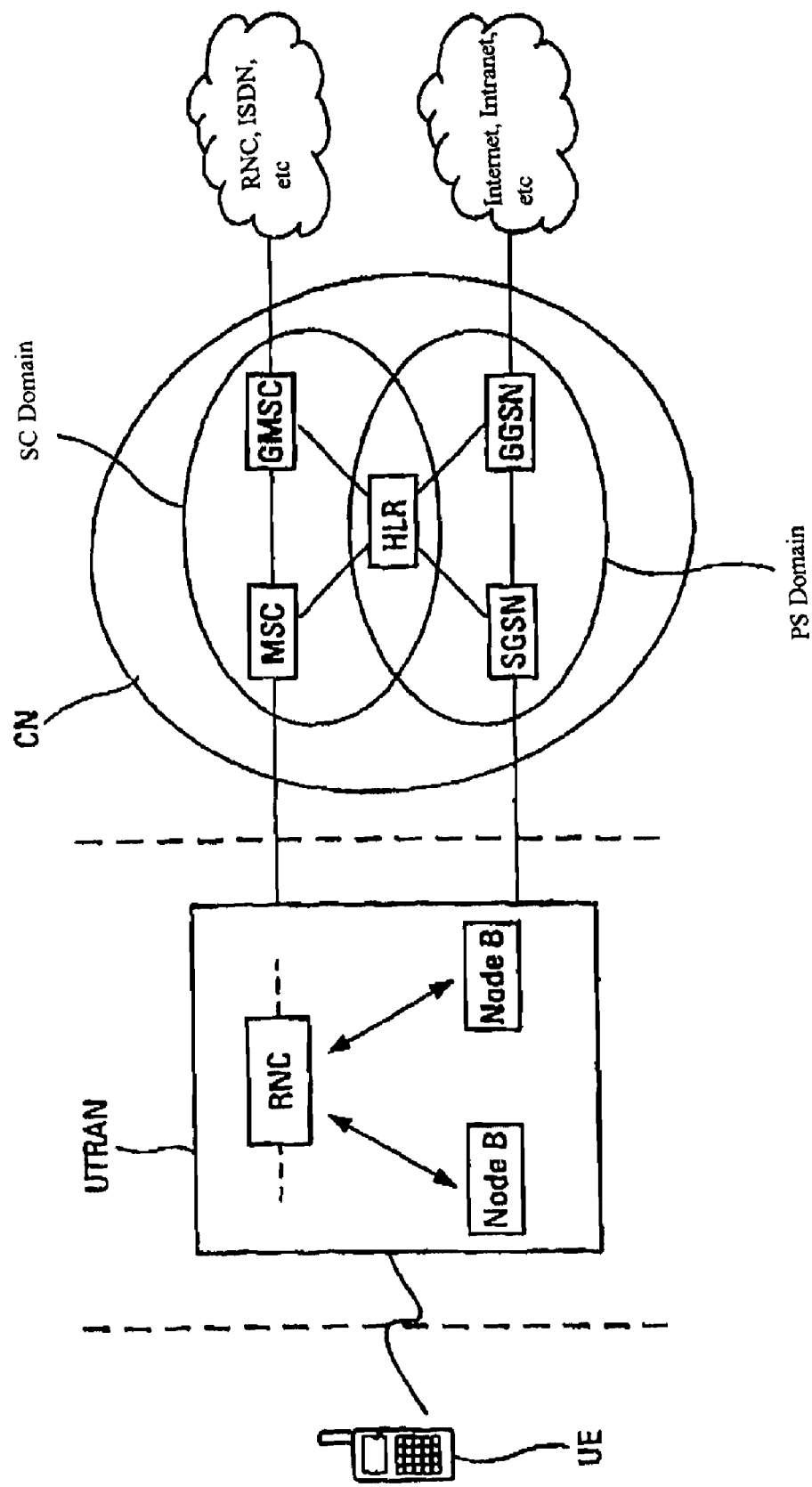

In terms of architecture, the UMTS network can be divided into two subnetworks, the core network CN and the radio access network also called UTRAN as shown in FIG. 1.

The access network includes a plurality of Node B radio base stations designed to communicate with User Equipment UE through a radio interface using radio resources allocated by a Radio Network Controller RNC node. The hierarchical architecture in which one entity controls several lower level entities is identical to the GSM radio access network. The radio network controller RNC acts as the GSM Base Station Controller (BSC). However, the radio technologies used to transport the information are different.

The UMTS Core Network CN comprises two distinct domains, namely the circuit domain CS that includes all services related to telephony, and the packet domain PS that includes all services related to packet switching.

The core network includes the HLR that is a database common to the two domains, in which information about all of the network operator's subscribers are stored; the subscriber call number, the identity of the mobile and information about the subscription. The HLR also contains quality of service information related to subscribers and services that will be defined later in the description. Thus, this database is used for management of mobile subscribers within the network.

The core network also hosts MSC circuit switches and SGSN packet switches. These support nodes in the core network are used to control the communication link with the access network. They store the subscriber's profile obtained from the HLR and control network resources requested by the subscriber.

In the packet domain, the SGSN is associated with another support node, the GGSN, that more particularly acts as a gateway towards external packet switching networks (Internet, etc.). Therefore, for the packet domain, the UMTS core network is interconnected with the outside through a gateway, the support node GGSN that contains routing information that the mobile uses to communicate with an external network, and particularly the Internet network, while maintaining security. The GGSN then sends information to the mobile using the other support node, the SGSN, that controls mobility in the core network, authentication, and encryption. These network elements include IP router functions and form an IP type network.

In the circuit domain, and as explained with reference to the packet domain, the MSC is associated with another support node, the GMSC, acting as a gateway to fixed RNC, ISDN type networks, etc.

In Release 99, all UMTS services are supported by four standard traffic classes, namely "Conversational", "Streaming", "Interactive" and "Background".

"Conversational" and "Streaming" classes are designed mainly to carry real time flows such as voice or video. However, for the "Streaming" class corresponding to use in which a user is looking at a video stream (or listening to an audio stream) in real time, the constraint on data transfer times is not as severe as in the "Conversational" class.

"Interactive" and "Background" classes correspond to non-real time services and are provided for use in the framework of traditional Internet applications such as navigation, electronic mail, FTP applications. These latter classes are non-real time, and offer better performances in error rates due to retransmission and coding methods.

The main distinctive factor between these classes is actually the sensitivity to delays. The "Conversational" traffic class will be very sensitive to delays, while the "Background" traffic class will not be at all sensitive.

The distribution of resources, and more particularly radio resources, within the access network are controlled making use of Quality of Service (QoS) parameters associated with a service request.

QoS parameters of the UMTS bearer service thus describe the service rendered through the UMTS network to the user of the UMTS bearer service. The QoS profile, formed by a set of QoS parameters, specifies this service. Therefore, these are standard parameters used to define the principal characteristics of a data stream on the network, particularly in terms of throughput, traffic type, priority, etc. These data are stored in the subscriber's profile in the HLR and are transmitted to the next entities (SGSN and MSC) by different procedures.

The QoS profile of the UMTS subscriber actually corresponds to the best QoS that the subscriber can request. The QoS profile can also be a default profile configured by the operator.

These QoS parameters specified in the QoS profile are principally:
"Allocation Retention Priority" (ARP): this QoS parameter is used to identify traffic priority between several subscribers for allocation and preemption of UMTS bearer services. A parameter of this type is specified for each domain—the packet domain and the circuit domain.
"Traffic Class": this QoS parameter indicates the priority related to the service type. As mentioned above, in Release 99 all services are supported by four traffic classes. This QoS parameter can thus be set equal to the "Conversational" (corresponding to a high priority, since the real time requirement is very important), "Streaming", "Interactive" and "Background" (low priority) values.

"Traffic Handling Priority" (THP): this QoS parameter specifies the priority level for the "Interactive" traffic class. This parameter may be equal to one of three values and can thus define priorities of "Interactive" type profiles with respect to each other.

These parameters include the following, given for information only because they are not used within the framework of this invention:

"Transfer delay"; this QoS parameter gives the maximum delay during transfer of a packet. It is used for real time services only.

"Guaranteed bit rate": this QoS parameter indicates the guaranteed throughput during transfer of a packet. It is only used for real time services.

"Maximum bit rate": this QoS parameter indicates the maximum throughput.

All QoS parameters mentioned above are defined in the framework of the 3GPP telecommunication standard. However, their use is not standardised.

In UMTS Release 99, the standard provides the possibility of having a priority level in subscriber data for packet and circuit services, at the HLR. The "Allocation Retention Priority" (ARP) parameter is used for this purpose. This parameter is defined at the HLR in the core network for each subscribed PDP context for the packet domain or by subscriber for the circuit domain.

Therefore, the ARP parameter can define a priority between subscribers for allocation/conservation of radio resources. The ARP parameter is used in the MSC, the SGSN, the GGSN and UTRAN to give a priority to a subscriber service request and may be one of three values in the core network, namely priority 1, priority 2 and priority 3, in which priority 3 is the lowest.

The ARP parameter is sent to the UTRAN RNC in the form of four sub-parameters, to associate a priority level to a communication corresponding to a subscriber service request. Therefore this parameter is transformed into four sub-parameters at the core network to be sent to the UTRAN RNC, namely "Priority Level", "Preemption Capability", "Preemption Vulnerability" and "Queuing allowed", the values of which are derived from the ARP parameter of the core network. These four sub-parameters are defined more precisely in part TS 25.413 of the 3GPP standard.

Starting from priority parameters sent by the core network CN, the UTRAN must be capable of distributing all of its resources (namely radio resources, transport resources and the processing capability) between the different system users.

A PDP context activation procedure is described with reference to FIG. 2. It enables a mobile terminal MS to request that a PDP context should be memorised in the SGSN and GGSN and thus to reserve resources in the core network for execution of the service requested by the subscriber. When a PDP context is activated, the different nodes in the UMTS network receive quality of service information related to the requested PDP context and the subscriber's subscription, particularly the traffic class and the priority of the subscriber defined by the ARP parameter.

The information corresponding to the subscriber's priority, in other words the ARP parameter contained in the data defining PDP contexts subscribed to by the subscriber, is transmitted to the SGSN when updating the position of the subscriber. This information is then transmitted to the GGSN during activation of a PDP context by the subscriber, then to the RNC in the form of four sub-parameters defined above.

Therefore, the procedure to activate a PDP context takes place when the subscriber would like to send or receive data on a network to execute a service to which he has subscribed, and is triggered at the initiative of the mobile subscriber, thus allowing the terminal to be known to the GGSN support node that makes the interconnection with the external network requested by the subscriber. Therefore, at the end of this procedure to active a PDP context, the corresponding quality of service profile is exchanged between the different network nodes, and the data transmission between the UMTS network and the external network corresponding to the service requested by the subscriber can then begin.

In step 1, the mobile terminal MS requests its home SGSN to activate a PDP context, specifying the requested QoS. The SGSN can modify the requested QoS depending on the subscription data and other parameters.

In steps 2 and 3, the SGSN forwards the request to the GGSN, possibly modifying QoS parameters. The term "negotiated QoS" is then used. The GGSN can then modify the QoS again and send it back to the SGSN.

In steps 4 and 5, the SGSN requests the RNC to allocate radio resources necessary for a communication channel by describing the negotiated QoS in the form of a so-called Radio Access Bearer RAB service request, comprising a set of quality of service parameters called RAB parameters in the standard, which in particular include the traffic class and the four sub-parameters output from the ARP parameter of the core network. The RAB parameters are defined in section 9.2.1.3 in standard 3GPP TS 25.413 v4.0.0.

The RNC accepts the request and starts from RAB attributes to size and allocate radio resources necessary for the communication channel provided to support this service request. It checks if the necessary resources are available, and if they are not, it must manage the shortage of resources as a function of the quality of service parameters associated with previously active communication channels and parameters of the new request. The RNC can then accept or refuse the requested communication channel.

In step 6, the SGSN accepts the request from the mobile, sending it the quality of service that it obtained on the network.

In the circuit domain, we will consider the example of a videophone type outgoing call request. In a first step, the mobile sends its service request to the core network aiming at obtaining a communication channel with the requested quality of service. The requested QoS characteristics are contained in the field containing bearer network capabilities (Bearer Capability). This specifies the throughput, the requested connection type, etc. The request is forwarded to the ISDN type fixed network in a second step.

Finally, the core network sends its corresponding radio resource allocation request, describing the service request in the form of RAB parameters as described above. The RNC calculates the necessary radio resources that will have to be allocated to the communication channel to support this service request. It verifies if these resources are available and if they are not, it must manage the shortage of resources as a function of the quality of service parameters associated with previously active communication channels and the parameters of the new request. The RNC can then accept or reject the requested communication channel.

An important constraint to be taken into account is that the UTRAN must be capable of distributing all its resources (that can for example be described as the radio resources (Uu interface), transport resources (Iu, Iub and Iur interface), and the processing capability) between the different users of the system starting from quality of service parameters sent by the CN. A preemption procedure specified in the standard may be used to do this, to facilitate access to resources for users or services considered by the operator as being priority when the resources to satisfy the requested QoS are not available.

When the resource allocation request is made, there is always a risk that the requested resources may be partially or completely unavailable. The admission check located in UTRAN can detect lack of resources managed by the access network. For example, these resources may be characterised according to:

- the power, in the up and the down directions,
- codes, mainly in the down direction,
- the processing capability corresponding to physical resources in the different equipment making up the access network,
- the transmission capability on the transport network, in other words resources allocated on the different physical connections connecting the different equipment forming the access network.

The system must assure that resources at the UTRAN are allocated/used optimally between all subscribers with the right to access services proposed by the operator. The standard proposes that subscribers should be treated differently depending on their priority as defined by the type of subscription taken out with the network operator, based on a preemption procedure.

Specifically, the preemption procedure involves use of algorithms to reduce resources allocated to a given service, to obtain sufficient resources to satisfy a request considered to be priority.

But references to resource preemption procedures in UTRAN given in the 3GPP standard are extremely brief and essentially simply define the following rule according to which the UTRAN can only use mechanisms to preempt resources of RABs with a lower priority, in an upwards order of priority. However, the criteria for assigning a priority level to one RAB instead of another RAB to access resources are not described in the standard.

Therefore, the manner of defining access priorities to resources in UTRAN, and the use of priority parameters sent by the CN and that are included in RAB parameters (in other words parameters of the "Allocation Retention Priority" group) are dependent on the implementation chosen by network constructors.

Yet, the preemption concept is very important for UMTS operators, because it controls the management of the subscriber classes and defines a strategy for access to radio resources. Furthermore, starting from the moment at which preemption becomes possible on a network, there is no mechanism described in the standard to define which resources will be preempted, from which user, and how many.

In this context, the purpose of this invention is to overcome the weaknesses mentioned above, by proposing a multi-criteria mechanism for preemption of radio resources, using different criteria for choosing how resources will be preempted, and how many will be preempted, thus allowing the network operator to define a more flexible strategy for sharing and allocation of network access resources.

With this objective in mind, the purpose of the invention is a method for management of radio resources in a mobile communication network, said resources being allocated to a plurality of communication channels each associated with a set of requested quality of service parameters, said method comprising the use of a resource preemption procedure following the acceptance of a new request for a communication channel associated with a set of requested quality of service parameters and following the detection of a lack of resources necessary to support said new request, the resource preemption procedure being designed to modulate allocation of resources to previously active communication channels as a function of the priority level associated with each of them so as to setup an order relation between the different communication channels, characterised in that said preemption procedure comprises the following steps consisting of:

- a—identify active communication channels on the network that might be preempted and among them, to select the lowest priority communication channel according to predefined selection criteria,
- b—evaluate the gain in radio resources obtained by at least partial reconfiguration of the selected communication channel, said selected communication channel and said associated gain being memorised in a reconfiguration list,
- c—check if the gain achieved by all communication channels included in the list is sufficient to support said new request,
- d—repeat steps a to c:
   - until the gain obtained is sufficient, in which case the communication channels included in the list are reconfigured and the new request is accepted, or
   - until all communication channels that could be preempted have been evaluated without obtaining sufficient gain, in which case the new request is refused.

Preferably, the step to identify communication channels that could be preempted consists of determining bearer services for which the associated priority level is lower than the priority level associated with the new request.

Advantageously, the communication channels that could be preempted also satisfy the condition according to which the quality of service described from at least an associated quality of service parameter is better than a predetermined minimum quality of service.

Preferably, the minimum quality of service corresponds to a minimum binary throughput value, the communication channels that could be preempted satisfying the condition according to which an associated quality of service parameter for a throughput includes a value greater than said minimum predefined throughput value.

According to one embodiment, reconfiguration of a selected communication channel consists of preempting all resources allocated to said communication channel.

According to another embodiment, reconfiguration of a selected communication channel consists of preempting part of the resources allocated to said channel such that the quality of service described starting from at least the associated quality of service parameter reaches the predetermined minimum quality of service.

Advantageously, the selected communication channel is memorised in the reconfiguration list after checking that the gain obtained by its reconfiguration is greater than or equal to a configurable reconfiguration threshold.

Preferably, the lowest priority communication channel among the communication channels that could be preempted is selected taking account of at least the priority level and a throughput quality of service parameter associated with each of said communication channels.

Advantageously, the lowest priority communication channel among the communication channels that could be preempted is selected also taking account of at least one quality of service parameter related to the service type associated with each of said communication channels.

According to one embodiment, the priority level associated with a communication channel is defined by the value of the "Priority Level" parameter determined taking account firstly of the value of the "Allocation retention Priority" quality of service parameter, and secondly the value of at least one quality of service parameter related to the service type.

Preferably, the quality of service parameters related to the type of service used to determine the value of the "Priority level" parameter defining the priority level for the corresponding communication channel, include the "Traffic class" parameter.

Preferably, the quality of service parameters related to the type of service used to determine the value assigned to the "Priority level" parameter defining the priority level for the corresponding communication channel, also include the "Traffic handling Priority" parameter that defines priorities for interactive type services with respect to each other.

The invention also relates to a radio resource management device in a mobile communication network comprising means of allocating resources to a plurality of communication channels each associated with a set of quality of service parameters, characterised in that it comprises means of implementing the method according to the invention.

The invention also relates to a computer program stored on a data medium, characterised in that it includes software instructions to control execution of the method according to the invention.

Figure 2:
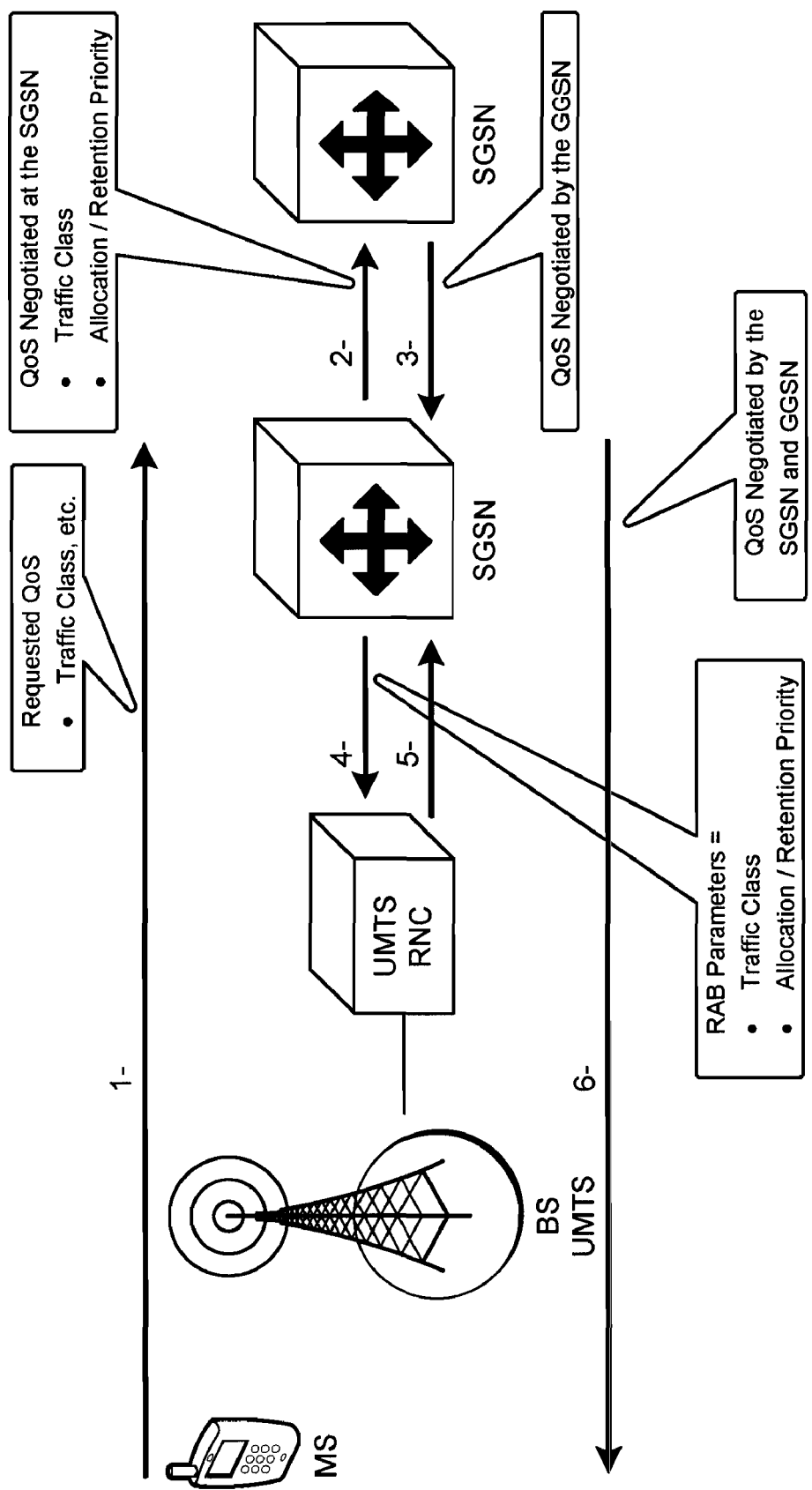
Figure 3:
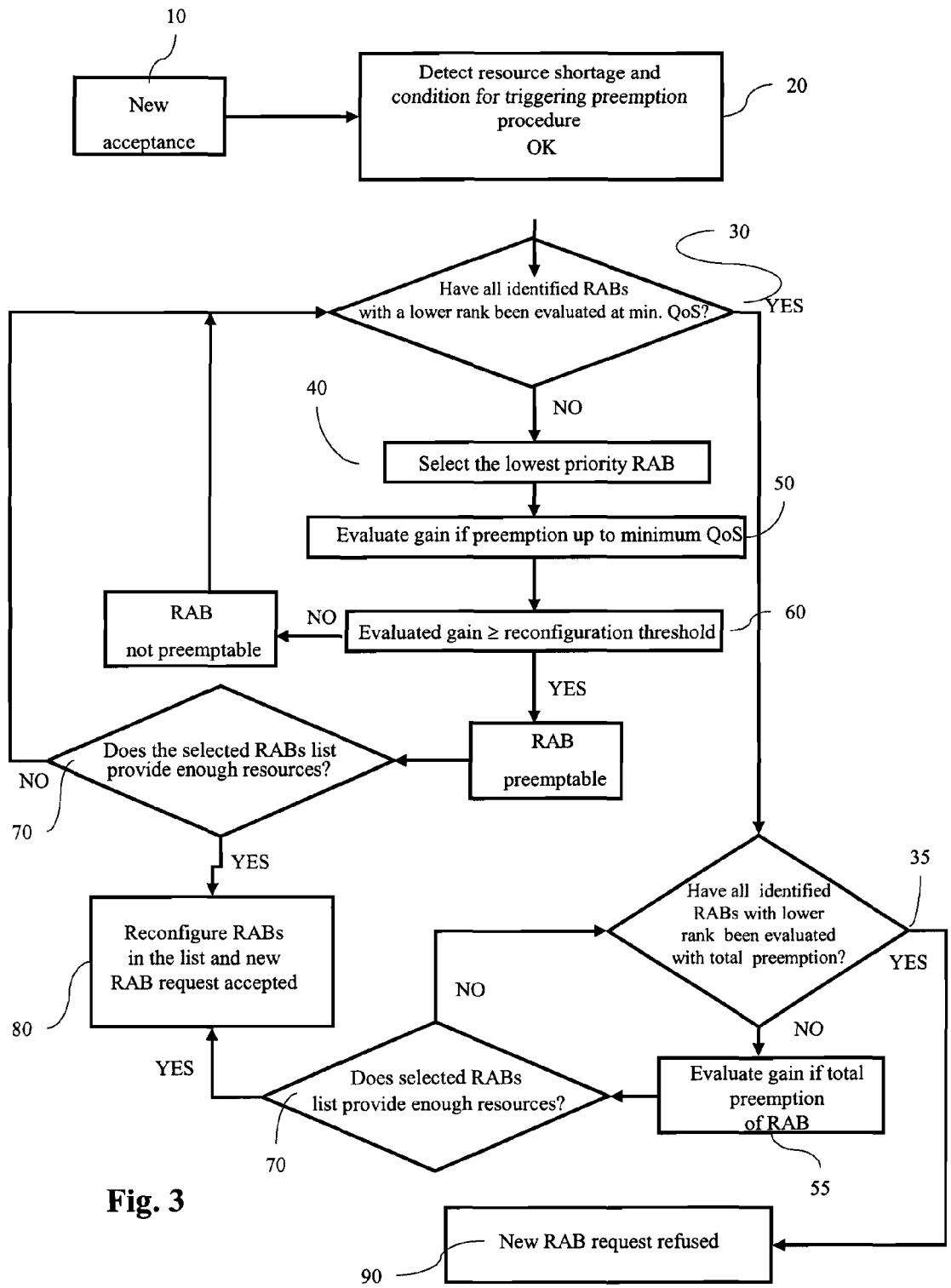

Other characteristics and advantages of this invention will appear more clearly after reading the following description given as an illustrative and non-limitative example with reference to the appended figures in which:

FIG. 1 describes the architecture of a UMTS type network and has already been described, FIG. 2 describes the procedure to activate a PDP context for the packet domain and has already been described, and FIG. 3 is a flow chart illustrating a particular embodiment for use of the method according to the invention.

Therefore, FIG. 3 describes a particular embodiment for use of the preemption procedure to manage allocation of radio resources at the UTRAN.

Thus, on acceptance (reference 10 in FIG. 3) of a new service request on the UMTS network, the core network sends a corresponding radio resource allocation request to the UTRAN in the form of a set of quality of service parameters. The UTRAN, and particularly the radio network controller RNC device, check acceptance by calculating the resources necessary for the communication channel to be used to support this service request. The preemption procedure may be used if the acceptance check located in the UTRAN detects (in step 20) that the resources managed by the access network are not sufficient to support this service request. The requested resources may be partially or fully unavailable.

For example, the detection of a lack or resources may be based on detection of lack of power in the down direction. The lack of resources may also be characterised by a lack of code, or lack of processing capability. In any case, characterisation of the lack of resources will depend on the network architecture and the equipment manufacturer.

The "Preemption Capability" parameter could be used to implement the preemption procedure, the value of which indicates whether or not the associated communication channel is capable of preempting resources of other previously active communication channels, and the "Preemption Vulnerability" parameter could also be used, the value of which indicates if the resources of the associated communication channel can be preempted by other communication channels.

Thus for example, in order to use the preemption procedure, the value of the "Preemption Capability" parameter for a channel for which acceptance creates resource problems, should indicate that the corresponding channel can preempt other communication channels. The preemption procedure can then be triggered to reduce allocation of radio resources to previously active communication channels as a function of their priority, possibly to accept the new channel request.

To achieve this, a step 30 is used to identify communication channels active on the network that could be preempted. According to the example, this identification step may consist of determining active communication channels, for which firstly the associated "Preemption Vulnerability" parameter indicates the vulnerability to preemption, and secondly the associated priority level is lower than the priority level associated with the channel for which acceptance creates resource problems.

However, note that use of the "Preemption Capability" and "Preemption Vulnerability" parameters is optional in using the method.

The priority level associated with each channel request referred to herein, enabling setting up of an order relation between the different communication channels, may for example be defined by the value of at least one quality of service parameter related to the service type, namely the "Traffic Class" and "Traffic Handling Priority" parameters, or the value of the standard "Priority Level" parameter.

In one variant, the value of the "Priority level" parameter of the "Allocation Retention Priority" parameter used to define the priority level for each communication channel, could be determined taking account firstly of the value of the "Allocation Retention Priority" parameter for the core network, and secondly the value of at least one parameter related to the service type. In a first embodiment, quality of service parameters related to the service type, and used to determine the value assigned to the "Priority Level" subparameter to define the priority level associated with each communication channel, include the "Traffic Class" parameter that can be equal to one of four values. In a second embodiment, quality of service parameters related to the service type used also include the "Traffic Handling Priority" parameter that can be equal to one of the three values and that can be used to set priorities, in other words to put interactive type services (in other words services for which the value of the "Traffic Class" parameter is equal to "Interactive") into order by priority level.

In this way, up to twelve values for the "Priority level" parameter and therefore up to twelve priority levels can be defined for different communication channels, using the "Traffic Class" quality of service parameter and the "Allocation Retention Priority" quality of service parameter for the core network.

Moreover, up to eighteen values for the "Priority Level" parameter and therefore up to eighteen priority levels can be defined for different communication channels, using the "Traffic Class" parameter, the "Allocation Retention Priority" parameter for the core network and the "Traffic Handling Priority" parameter.

According to one preferred embodiment, the preemption procedure used according to the invention will guarantee that a subscriber whose resources are preempted will maintain a minimum quality of service. This minimum quality of service is defined from known parameters of UTRAN specific to a given communication channel request, including all or part of the quality of service profile.

Also according to this preferred embodiment, in order to identify (step 30) active communication channels on the network that could be preempted, it is also necessary for these channels to check that the quality of service described using at least one associated quality of service parameter is better than the minimum requested quality of service. Thus, defining the minimum quality of service can enable the operator to give preference to some quality of service parameters rather than others.

According to one example, the minimum quality of service corresponds to a minimum binary throughput value on the downlink. Therefore the quality of service associated with a given communication channel is to be understood in terms of binary throughput on the allocated downlink and is compared with the minimum throughput on the downlink. This is done using the "Maximum Bit Rate For Downlink" parameter requested when the connection is setup. Therefore the active communication channels that could be preempted need to verify that their associated quality of service parameter "Maximum Bit Rate For Downlink" value is greater than the requested quality of service value.

The requested quality of service value can also be described using the "Maximum Bit Rate For Uplink", "Guaranteed Bit For Downlink" and "Guaranteed Bit Rate For Uplink" throughput quality of service parameters.

If at least one communication channel that could be preempted has been identified in step 30, a step 40 is used consisting of selecting the lowest priority communication channel among the communication channels identified as being preemptable, according to predefined selection criteria.

For example, the first step is to select communication channels in decreasing order of the value of the standard "Priority Level" parameter. The first step performed in sub-groups composed of communication channels with the same priority level is to select communication channels for which the traffic class is of the "Background" type, and then communication channels for which the traffic class is of the "Interactive" type.

According to the variant mentioned above in which the "Priority Level" parameter used to define the priority level for each communication channel is determined taking account firstly of the value of the "Allocation Retention Priority" parameter sent by the core network, and secondly the value of at least one quality of service parameter related to the service type, the lowest priority communication channel among the communication channels identified as being preemptable is selected simply by selecting the communication channels in decreasing order of the value of the "Priority Level" parameter.

Then within the subgroups formed by communication channels with the same priority level, the communication channels may for example be selected in increasing order of the ratio of the binary throughput on the allocated downlink to the predetermined minimum binary throughput to guarantee a minimum quality of service.

After selecting the lowest priority communication channel among the communication channels identified as being preemptable, a step 50 is applied to evaluate the gain in resources obtained if this communication channel is reconfigured, consisting of estimating the gain to be obtained if the resources allocated to this communication channel are preempted to reach the minimum predetermined quality of service, namely in the example the minimum binary throughput on the fixed downlink.

The gain in resources obtained is preferably compared in a step 60 with a reconfigurable threshold defined by parameters. We could define a configurable threshold below which it is considered that the gain obtained is not sufficient. Resources are then not preempted on this communication channel. The purpose of defining such a threshold is to limit the number of communication channel reconfigurations.

In one example embodiment, if the gain in resources obtained, for example characterised by a gain of the total power in the down direction, is less than a configurable threshold of 10% of the requested power to accept the new communication channel corresponding to the new service request, the selected communication channel will be considered as being non preemptable and the procedure will resume at step 30. Otherwise, the selected communication channel will be considered as being preemptable and will be included with the evaluated gain associated with this communication channel in a reconfiguration list comprising the communication channels to be reconfigured.

A step 70 then consists of verifying whether or not the gain obtained from all communication channels included in the reconfiguration list for preemption releases enough resources to serve the resources request for the requested communication channel.

Steps 30 to 70 are repeated until the gain obtained is sufficient, and if it becomes sufficient a step 80 is implemented in which the communication channels included in the reconfiguration list are reconfigured so as to effectively recover the resources necessary to accept the new communication channel, and the procedure is terminated.

Another case can arise in which steps 30 to 70 are repeated until all communication channels identified as being preemptable have been evaluated in terms of gain of resources with the minimum QoS, but without obtaining the necessary gain in resources.

In the case in which the gain obtained after reconfiguring all communication channels with a rank lower than the minimum quality of service is not sufficient, the procedure includes a means of preempting all resources of all communication channels that could be preempted.

Thus, when all identified communication channels with a lower rank have been evaluated at the minimum quality of service without obtaining sufficient gain, a step 35 is implemented consisting of identifying all communication channels that could be preempted without any condition of respecting a minimum quality of service. Therefore, this includes communication channels for which firstly the associated "Preemption Vulnerability" RAB parameter indicates vulnerability to preemption, and secondly the associated priority level is lower than the priority level associated with the new channel request.

The loop described above with reference to steps 30 to 70 is used again on communication channels identified as being preemptable in step 35, except that step 50 is replaced by a step 55 that consists of estimating the gain in resources obtained for a selected communication channel, if resources allocated to this communication channel were fully preempted. Similarly, the procedure loops until the gain obtained from all communication channels included in the reconfiguration list is sufficient.

However, if all identified communication channels that could be preempted are evaluated at full preemption in this second loop and the gain obtained is still not sufficient to support the new service request, then this service request will be refused as described for step 90 and the procedure terminates.

The preemption procedure could also be used based on communication channels identified as possibly being subject to preemption, evaluated directly with total preemption without carrying out a first phase with a minimum quality of service to be respected.

The UTRAN must include data processing means arranged so as to perform the different steps in the method according to the invention, in the RNC radio network controller devices. More precisely, steps in the method described above are executed by a data processing device, in fact the radio network controller device under the control of software instructions. Consequently, the invention also relates to a computer program that can be stored in or transmitted by a data medium comprising software instructions to control execution of the method by a computer device. The data medium may be a hardware storage medium, for example CD-ROM, a magnetic diskette or a hard disk, or a transmissible medium such as an electrical, optical or radio signal.

The embodiment described relates to the UMTS network. Obviously, the invention is applicable to the GPRS network and to all similar types of mobile communication networks.

GLOSSARY

This glossary presents the list of acronyms used in this patent application. Most of these acronyms are defined in the framework of the 3GPP telecommunication standard.

| | |
|---|---|
| 3GPP | Third-Generation Partnership project (of ETSI) |
| GSM | Global System for Mobile Communication |
| UMTS | Universal Mobile Telecommunication System |
| IP | Internet protocol |
| BSC | Base Station Controller |
| HLR | Home Location Register |
| SGSN | Serving GPRS Support Node |
| GGSN | Gateway GPRS Support Node |
| UTRAN | UMTS Terrestrial Radio Access Network |
| RNC | Radio Network Controller |
| QoS | Quality of Service |
| FTP | File Transfer Protocol |
| ARP | Allocation Retention Priority |
| PDP | Packet Data Protocol |
| THP | Traffic Handling Priority |
| RAB | Radio Access Bearer |

The invention claimed is:

1. A method for managing radio resources in a mobile communication network, said resources being allocated to a plurality of communication channels each associated with a set of requested quality of service parameters, said method comprising the use of a resource preemption procedure following the acceptance of a new request for a communication channel associated with a set of requested quality of service parameters and following the detection of a lack of resources necessary to support said new request, the resource preemption procedure being designed to modulate allocation of resources to previously active communication channels as a function of a priority level associated with each of them, so as to set up an order relation between the different communication channels, wherein said preemption procedure comprises the following steps:
   a) identifying active communication channels on the network that might be preempted and among them, selecting the lowest priority communication channel according to predefined selection criteria;
   b) evaluating the gain in radio resources obtained by at least partial reconfiguration of the selected communication channel, said selected communication channel and said associated gain being memorized in a reconfiguration list;
   c) checking if the gain achieved by all communication channels included in the list is sufficient to support said new request; and
   d) repeating steps a to c:
      until the gain obtained is sufficient, in which case the communication channels included in the list are reconfigured and the new request is accepted, or
      until all communication channels that could be preempted have been evaluated without obtaining sufficient gain, in which case the new request is refused.

2. The method according to claim 1, wherein the step of identifying communication channels that could be preempted comprises determining bearer services for which an associated priority level is lower than a priority level associated with the new request.

3. The method according to claim 2, wherein the communication channels that could be preempted also satisfy a condition according to which the quality of service described from at least an associated quality of service parameter is better than a predetermined minimum quality of service.

4. The method according to claim 3, wherein the quality of service parameters related to the type of service used to determine the value assigned to the "Priority level" parameter defining the priority level for the corresponding communication channel, also include a "Traffic handling Priority" parameter that defines priorities for interactive type services with respect to each other.

5. The method according to claim 2, wherein the reconfiguration of a selected communication channel comprises preempting all resources allocated to said communication channel.

6. The method according to claim 1, wherein the communication channels that could be preempted also satisfy a condition according to which the quality of service described from at least an associated quality of service parameter is better than a predetermined minimum quality of service.

7. The method according to claim 6, wherein the minimum quality of service corresponds to a minimum binary throughput value, and wherein the communication channels that could be preempted satisfy the condition according to which an associated quality of service parameter for a throughput includes a value greater than said minimum predefined throughput value.

8. The method according to claim 7, wherein the reconfiguration of a selected communication channel comprises preempting part of the resources allocated to said channel such that the quality of service described starting from at least the associated quality of service parameter reaches the predetermined minimum quality of service.

9. The method according to claim 6, wherein the reconfiguration of a selected communication channel comprises preempting part of the resources allocated to said channel such that the quality of service described starting from at least the associated quality of service parameter reaches the predetermined minimum quality of service.

10. The method according to claim 1, wherein the reconfiguration of a selected communication channel comprises preempting all resources allocated to said communication channel.

11. The method according to claim 1, wherein the selected communication channel is memorized in the reconfiguration list after checking that the gain obtained by its reconfiguration is greater than or equal to a configurable reconfiguration threshold.

12. The method according to claim 1, wherein the lowest priority communication channel among the communication channels that could be preempted is selected taking account of at least the priority level and a throughput quality of service parameter associated with each of said communication channels.

13. The method according to claim 12, wherein the lowest priority communication channel among the communication channels that could be preempted is selected also taking account of at least one quality of service parameter related to the service type associated with each of said communication channels.

14. The method according to claim 1, wherein the priority level associated with a communication channel is defined by a value of a "Priority Level" parameter determined taking account firstly of a value of an "Allocation retention Priority" quality of service parameter, and secondly a value of at least one quality of service parameter related to the service type.

15. The method according to claim 14, wherein the quality of service parameters related to the type of service used to determine the value of the "Priority level" parameter defining the priority level for the corresponding communication channel, include a "Traffic class" parameter.

16. A radio resource management device in a mobile communication network comprising means of allocating resources to a plurality of communication channels each associated with a set of quality of service parameters, wherein the means of allocating resources comprises means of implementing a method comprising the use of a resource preemption procedure following the acceptance of a new request for a communication channel associated with a set of requested quality of service parameters and following the detection of a lack of resources necessary to support said new request, the resource preemption procedure being designed to modulate allocation of resources to previously active communication channels as a function of a priority level associated with each of them, so as to set up an order relation between the different communication channels, wherein said preemption procedure comprises the following steps:
  a) identifying active communication channels on the network that might be preempted and among them, selecting the lowest priority communication channel according to predefined selection criteria;
  b) evaluating the gain in radio resources obtained by at least partial reconfiguration of the selected communication channel, said selected communication channel and said associated gain being memorized in a reconfiguration list;
  c) checking if the gain achieved by all communication channels included in the list is sufficient to support said new request;
  d) repeating steps a to c:
    until the gain obtained is sufficient, in which case the communication channels included in the list are reconfigured and the new request is accepted, or
    until all communication channels that could be preempted have been evaluated without obtaining sufficient gain, in which case the new request is refused.

17. The radio resource management device according to claim 16, wherein the step of identifying communication channels that could be preempted comprises determining bearer services for which an associated priority level is lower than a priority level associated with the new request.

18. The radio resource management device according to claim 17, wherein the communication channels that could be preempted also satisfy the condition according to which the quality of service described from at least an associated quality of service parameter is better than a predetermined minimum quality of service.

19. The radio resource management device according to claim 16, wherein the communication channels that could be preempted also satisfy a condition according to which the quality of service described from at least an associated quality of service parameter is better than a predetermined minimum quality of service.

20. A computer program product tangibly stored on a data medium, and comprising software instructions to control execution of a method for managing radio resources in a mobile communication network, said resources being allocated to a plurality of communication channels each associated with a set of requested quality of service parameters, said method comprising the use of a resource preemption procedure following the acceptance of a new request for a communication channel associated with a set of requested quality of service parameters and following the detection of a lack of resources necessary to support said new request, the resource preemption procedure being designed to modulate allocation of resources to previously active communication channels as a function of a priority level associated with each of them, so as to set up an order relation between the different communication channels, wherein said preemption procedure comprises the following steps:
  a) identifying active communication channels on the network that might be preempted and among them, selecting the lowest priority communication channel according to predefined selection criteria;
  b) evaluating the gain in radio resources obtained by at least partial reconfiguration of the selected communication channel, said selected communication channel and said associated gain being memorized in a reconfiguration list;
  c) checking if the gain achieved by all communication channels included in the list is sufficient to support said new request;
  d) repeating steps a to c:
    until the gain obtained is sufficient, in which case the communication channels included in the list are reconfigured and the new request is accepted, or
    until all communication channels that could be preempted have been evaluated without obtaining sufficient gain, in which case the new request is refused.

* * * * *